Patented Apr. 7, 1936

2,036,703

UNITED STATES PATENT OFFICE 2,036,703

PROCESS OF DYEING WOOL

Hans Krzikalla and Walter Limbacher, Ludwigshafen-on-the-Rhine, Germany, assignors to General Aniline Works, Inc., New York, N. Y., a corporation of Delaware No Drawing. Application September 5, 1934, Serial No. 742,801. In Germany September 30, 1933

6 Claims. (Cl. 8—5)

The present invention relates to a process of dyeing wool.

We have found that wool may advantageously be dyed according to the single-bath process while employing chromium compounds, by means of azo dyestuffs containing but one sulphonic acid group in the molecule which are obtainable by coupling the diazo compound of a diazotizable aromatic amine free from carboxylic acid groups, nitro groups and halogen and having no hydroxy group in the ortho-position to the amino group, with 8-hydroxyquinoline. The sulphonic acid group may be contained in the amine or the 8-hydroxyquinoline employed.

The process is preferably carried out by charging the dye-bath with about 3 to 8 per cent by weight of a mixture of ammonium chromate or sodium chromate and ammonium sulphate previously dissolved by boiling, and adding to the bath the dissolved dyestuff together with 10 per cent of Glauber's salt (calculated with reference to the weight of the goods to be dyed). The wool is introduced at room temperature or at 50° to 60° C. and then the dye-bath is slowly heated to boiling and kept boiling for 1 to 2 hours.

The dyeings obtained are distinguished by excellent properties as regards fastness, as for example fastness to washing, fulling and light.

Dyestuffs especially suitable for the purpose of the present invention may be prepared by employing the components set forth in the following table, but the invention is not restricted to these specific examples.

Table

| Diazo component | Coupling component | Shade obtained on wool according to the single-bath process |
|---|---|---|
| 1-aminobenzene-4-sulphonic acid | 8-hydroxyquinoline | Orange |
| 1-aminobenzene-3-sulphonic acid | 8-hydroxyquinoline | Orange |
| 1-aminobenzene-2-sulphonic acid | 8-hydroxyquinoline | Orange |
| 1-methyl-4-aminobenzene-3-sulphonic acid | 8-hydroxyquinoline | Orange |
| 1-methyl-4-aminobenzene-2-sulphonic acid | 8-hydroxyquinoline | Orange |
| 1-methoxy-2-aminobenzene-4-sulphonic acid | 8-hydroxyquinoline | Orange |
| 3-amino-4-cresolmethyl-ether-6-sulphonic acid | 8-hydroxyquinoline | Red orange |
| 1-naphthylamine-4-sulphonic acid | 8-hydroxyquinoline | Red brown |
| 1-aminobenzene-4-sulphonic acid | 5-methyl-8-hydroxyquinoline | Red orange |
| 1-aminobenzene-3-sulphonic acid | 5-methyl-8-hydroxyquinoline | Orange |
| 1-aminobenzene-3-sulphonic acid | 5-chlor-8-hydroxyquinoline | Yellow brown |
| Aniline | 8-hydroxyquinoline-5-sulphonic acid | Orange yellow |
| 1-methyl-4-aminobenzene | 8-hydroxyquinoline-5-sulphonic acid | Orange |
| 1-methyl-3-aminobenzene | 8-hydroxyquinoline-5-sulphonic acid | Orange |

Table—Continued

| Diazo component | Coupling component | Shade obtained on wool according to the single-bath process |
|---|---|---|
| 1-methoxy-4-aminobenzene | 8-hydroxyquinoline-5-sulphonic acid | Orange |
| 1-methoxy-2-aminobenzene | 8-hydroxyquinoline-5-sulphonic acid | Orange |
| 1-ethoxy-4-aminobenzene | 8-hydroxyquinoline-5-sulphonic acid | Orange |
| Meta-xylidine | 8-hydroxyquinoline-5-sulphonic acid | Orange |

What we claim is:—

1. A process of dyeing wool according to the single-bath chromium compound dyeing process which comprises employing azo dyestuffs obtainable by coupling a diazotized aromatic amine free from carboxylic acid groups, nitro groups and halogen and having no hydroxy group in the ortho-position to the amino group, with an 8-hydroxyquinoline only one of the components having a sulphonic acid group.

2. A process of dyeing wool according to the single-bath chromium compound dyeing process which comprises employing azo dyestuffs obtainable by coupling the monosulphonic acid of a diazotized aromatic amine free from carboxylic acid groups, nitro groups and halogen and having no hydroxy group in the ortho-position to the amino group, with an 8-hydroxyquinoline free from sulphonic acid groups.

3. A process of dyeing wool according to the single-bath chromium compound dyeing process which comprises employing azo dyestuffs obtainable by coupling a diazotized aromatic amine free from sulphonic and carboxylic acid groups, nitro groups and halogen and having no hydroxy group in the ortho-position to the amino group with an 8-hydroxyquinoline-5-sulphonic acid.

4. The process of dyeing wool according to the single-bath chromium compound dyeing process which comprises employing the azo dyestuff obtainable by coupling diazotized 1-aminobenzene-4-sulphonic acid with 8-hydroxyquinoline.

5. The process of dyeing wool according to the single-bath chromium compound dyeing process which comprises employing the azo dyestuff obtainable by coupling diazotized 1-aminobenzene-3-sulphonic acid with 5-chloro-8-hydroxyquinoline.

6. The process of dyeing wool according to the single-bath chromium compound dyeing process which comprises employing the azo-dyestuff obtainable by coupling diazotized 1-methoxy-4-aminobenzene with 8-hydroxyquinoline-5-sulphonic acid.

HANS KRZIKALLA.
WALTER LIMBACHER.